United States Patent
Suehiro et al.

(10) Patent No.: US 7,516,983 B2
(45) Date of Patent: Apr. 14, 2009

(54) GAS GENERATOR

(75) Inventors: Akihiko Suehiro, Himeji (JP); Takayoshi Dosai, Himeji (JP); Tetsuo Saito, Himeji (JP); Tameo Kawakami, Himeji (JP); Eishi Sato, Himeji (JP)

(73) Assignee: Nippon Kayaku Kabushiki-Kaisha, Tokyo (JP)

( * ) Notice: Subject to any disclaimer, the term of this patent is extended or adjusted under 35 U.S.C. 154(b) by 179 days.

(21) Appl. No.: 10/502,656

(22) PCT Filed: Feb. 6, 2003

(86) PCT No.: PCT/JP03/01226

§ 371 (c)(1),
(2), (4) Date: Aug. 4, 2004

(87) PCT Pub. No.: WO03/066390

PCT Pub. Date: Aug. 14, 2003

(65) Prior Publication Data

US 2005/0225064 A1   Oct. 13, 2005

(30) Foreign Application Priority Data

Feb. 6, 2002   (JP)   ............................. 2002-029846
Aug. 9, 2002   (JP)   ............................. 2002-232396

(51) Int. Cl.
   *B60R 21/26*   (2006.01)
(52) U.S. Cl. ........................................ 280/741; 55/525
(58) Field of Classification Search ................. 280/736, 280/741; 55/525; 422/164, 167
   See application file for complete search history.

(56) References Cited

U.S. PATENT DOCUMENTS

| 4,943,086 | A | * | 7/1990 | Cunningham ................ 280/741 |
| 4,964,654 | A | * | 10/1990 | Bishop et al. ............ 280/728.2 |
| 5,136,952 | A | * | 8/1992 | Bennett, Jr. ................. 102/530 |
| 6,056,319 | A | | 5/2000 | Ruckdeschel et al. |
| 6,394,491 | B2 | * | 5/2002 | Soderquist et al. .......... 280/736 |
| 6,406,053 | B1 | * | 6/2002 | Bayer et al. ................. 102/530 |
| 6,474,684 | B1 | * | 11/2002 | Ludwig et al. .............. 280/741 |

(Continued)

FOREIGN PATENT DOCUMENTS

CN   2455545 Y   10/2001

(Continued)

OTHER PUBLICATIONS

U.S. Appl. No. 10/567,024, filed Feb. 3, 2006, Saito et al.
U.S. Appl. No. 10/567,035, filed Feb. 3, 2006, Saito et al.

*Primary Examiner*—Ruth Ilan
*Assistant Examiner*—Karen Amores
(74) *Attorney, Agent, or Firm*—Oblon, Spivak, McClelland, Maier & Neustadt, P.C.

(57) ABSTRACT

A gas generator, including a housing made of metal and including an initiator shell and a closure shell; at least one combustion chamber formed in the housing and configured to be packed with a gas generant that generates a high temperature gas by burning; at least one filter member arranged around the at least one combustion chamber; at least one igniter located in the housing and configured to ignite and burn the gas generant in the at least one combustion chamber; and a plurality of gas discharge holes formed in the housing and configured to discharge gas generated in the at least one combustion chamber.

33 Claims, 9 Drawing Sheets

U.S. PATENT DOCUMENTS

| | | | |
|---|---|---|---|
| 6,547,278 B2 * | 4/2003 | Unterforsthuber et al. | 280/741 |
| 6,739,621 B2 * | 5/2004 | Parkinson et al. | 280/741 |
| 6,796,580 B1 * | 9/2004 | Kubo et al. | 280/741 |
| 6,890,002 B1 * | 5/2005 | Suehiro et al. | 280/741 |
| 6,926,304 B2 * | 8/2005 | Miyaji et al. | 280/741 |
| 6,929,284 B1 * | 8/2005 | Saso et al. | 280/741 |
| 6,997,477 B2 * | 2/2006 | Quioc | 280/741 |
| 7,007,971 B2 * | 3/2006 | Koga | 280/736 |
| 7,059,632 B2 * | 6/2006 | Iwakiri et al. | 280/736 |
| 2001/0007189 A1 | 7/2001 | Zettel et al. | 55/385.3 |
| 2003/0030259 A1 * | 2/2003 | Saso et al. | 280/741 |
| 2003/0042718 A1 * | 3/2003 | Katsuda et al. | 280/736 |
| 2003/0132623 A1 * | 7/2003 | Iwai et al. | 280/736 |
| 2003/0201629 A1 * | 10/2003 | Matsuda et al. | 280/736 |
| 2004/0061319 A1 * | 4/2004 | Saso et al. | 280/741 |
| 2004/0075258 A1 * | 4/2004 | Kubo et al. | 280/735 |
| 2004/0207188 A1 * | 10/2004 | Matsuda et al. | 280/741 |
| 2005/0161923 A1 * | 7/2005 | Hirooka et al. | 280/741 |
| 2005/0194772 A1 * | 9/2005 | Numoto et al. | 280/741 |
| 2005/0200107 A1 * | 9/2005 | Matsuda et al. | 280/741 |
| 2005/0225064 A1 * | 10/2005 | Suehiro et al. | 280/741 |
| 2006/0131853 A1 * | 6/2006 | Iwai et al. | 280/736 |
| 2006/0151978 A1 * | 7/2006 | Miyaji et al. | 280/736 |
| 2006/0186654 A1 * | 8/2006 | Yamazaki et al. | 280/741 |
| 2007/0063494 A1 * | 3/2007 | Saito et al. | 280/736 |
| 2007/0063495 A1 * | 3/2007 | Saito et al. | 280/736 |

FOREIGN PATENT DOCUMENTS

| | | | |
|---|---|---|---|
| FR | 2274015 | | 1/1976 |
| JP | 50-52733 | | 5/1975 |
| JP | 02155859 A | * | 6/1990 |
| JP | 2-144857 | | 12/1990 |
| JP | 2567583 | | 10/1996 |
| JP | 9-58397 | | 3/1997 |
| JP | 2618052 | | 3/1997 |
| JP | 10-29492 | | 2/1998 |
| JP | 2000 103692 | | 4/2000 |
| JP | 2000-296756 | | 10/2000 |
| JP | 2000-319086 | | 11/2000 |
| JP | 2001-97177 | | 4/2001 |
| JP | 2001 225712 | | 8/2001 |
| JP | 2001-278868 | | 10/2001 |
| JP | 2002-46569 | | 2/2002 |
| WO | WO 01/07299 | * | 2/2001 |
| WO | WO 01/47752 A1 | | 7/2001 |
| WO | WO 01/62558 | * | 8/2001 |

* cited by examiner

GAS GENERATOR

TECHNICAL FIELD

The present invention relates to a gas generator suitably used to expand an airbag and the like.

BACKGROUND ART

A gas generator used to expand and inflate the airbag rapidly so as to protect a vehicle occupant from the shock at a car collision is built in an airbag module secured in a steering wheel or an instrument panel. The gas generator operates to ignite an igniter device (squib) under control of electrical signals from a control unit (controller) to burn enhancer agent (enhancer) and then burn gas generant by the flames of the enhancer agent, thereby generating a large amount of gas rapidly.

A so-called, double-cylinder type gas generator having a central space, equivalent to an ignition chamber of the gas generant, and an annular space, equivalent to a combustion/filtering chamber, formed at the outside of the central space concentrically, for burning and cooling gas and collecting slag is known as a conventional gas generator.

This type of gas generator is disclosed, for example, by JP Laid-open (Unexamined) Patent Publication No. Hei 9-207705. As shown in FIG. 8, this gas generator has a housing formed in such a manner that a central space of a housing structure, serving as the ignition chamber, is formed by an upper casing 51 of a double-cylinder structure and a lower casing 54 of a double-short-cylinder structure being butt-welded by friction welding, first, and, then, an annular space, serving as the combustion/filtering chamber, is formed around the central space. A squib 68 and enhancer agents 69 are housed and contained in the ignition chamber P from below. On the other hand, a ring-shaped cover member 66 having a cross section of a double-flanged concave form is fixedly placed in the combustion/filtering chamber F, with its flanges 66d, 66e abutted with flashes 52b, 53b of the upper casing 51. Gas generant 57 and a cooling/slag collecting member 60 are contained in sequence in the annular space defined between the cover member 66 and the upper casing 51 so that they are arranged in a radial direction thereof. The combustion/filtering chamber F is formed in this manner. Ring-shaped cushioning members 58, 59 are provided at upper and lower sides of a layer of the gas generant 57, respectively. Also, seal members 61, 62 are provided at upper and lower sides of the cooling/slag collecting member 60, respectively. Further, an aluminum foil 64 to close a gas discharge orifice 53a and an aluminum foil 65 to close an enhancer orifice 52a are adhesively bonded. With this construction, the gas generator that can sufficiently withstand an increased inner pressure by the gas generated in a gas generation chamber G can be obtained.

However, this double-cylinder type gas generator requires an increased number of components of the gas generator and also requires a complicated structure, as shown in FIG. 8. Due to this, there are limits for this type of gas generator to cut the production cost while maintaining the safety of the gas generator. Further, this type of gas generator has a small capacity to hold the gas generant. Due to this, it is mainly applied to a driver's side airbag system and is never applicable to a passenger's seat airbag system requiring a large amount of generated gas.

For example the gas generator shown in FIG. 9 is known as the gas generator for an automobile passenger's seat airbag system. As shown in FIG. 9, the conventional gas generator for the passenger's seat airbag system has a housing 80 comprising an outer cylinder 81 having a plurality of gas discharge holes 81a and a cover member 82 friction-welded to an end of an aperture of the outer cylinder 81. An inner cylinder 85 is inserted and placed in the housing 80. The inner cylinder 85 has gas penetrating holes 85a, containing a prescribed amount of gas generant 86 in an interior thereof. A cylindrical burst plate 83 to close the gas discharge holes 81a formed in the outer cylinder 81 and a cylindrical filter member 84 are disposed in an annular space between the inner and outer cylinders. The cylindrical filter member 84 is packed in the annular space as tight as possible, leaving no space therein, for the purpose of reduction in diameter of the housing 80. Also, an igniter device 89 comprising an igniter 87 that ignites at the detection of collision by collision sensors and enhancer agent 88 ignited by the igniter 87 is disposed in the cover member 82.

This conventional gas generator for the passenger's seat airbag system has a cylindrical shape, as described above, and is built in the airbag module secured in an interior of the instrument panel of the automobile, with its body oriented horizontally along the instrument panel and both lengthwise ends thereof fixed therein. Due to this, a large occupied area is required for placement in the instrument panel. Also, the way of and the structure for assembling the gas generator in the airbag module are complicated, thus involving troublesome works.

Also, owing to the cylindrical shape, it is difficult to pack the gas generant 86 in the interior of the housing with high packing efficiency. Obtaining an equal amount of generated gas to conventional, while fulfilling the recent demands for reduction in size and weight of the gas generator, requires the use of gas generant that can generate more amount of gas. Doing so requires the housing capable of well withstanding the high pressure at the generation of gas.

It is an object of the present invention to provide a gas generator that can provide a simplified structure of the gas generator and also can exhibit good gas generation performances of generating a large amount of gas, while maintaining high safety, even when reduced in size and weight.

DISCLOSURE OF THE INVENTION

A gas generator according to the present invention comprises a housing made of metal and having an initiator shell and a closure shell, (a) combustion chamber(s) formed in the housing and packed with gas generant that generates high temperature gas by burning, (a) filter member(s) arranged around the combustion chamber(s), (an) igniter device(s) put in the housing for igniting and burning the gas generant in the combustion chamber(s), and a plurality of gas discharge holes formed at the housing for discharging gas generated in the combustion chamber(s), wherein either or both of the initiator shell and the closure shell forming the housing has a head portion of a semispherical form or an oval semispherical form and a cylindrical portion of a diameter formed continuously from the head portion, and wherein a ratio H/D between the diameter D of the cylindrical portion and a distance H between bottoms of the head portions of the initiator shell and closure shell is in the range of 0.6-1.3. It is preferable that the diameter D is a diameter $D_1$ between outer sides of the closure shell.

This construction can provide the result that even when the gas generator is reduced in number of components and is simplified in structure, deformation of the housing can be suppressed even when the pressure in the housing is increased by the gas generated by burning the gas generant in the combustion chamber. This can provide a reduced number of components and a simplified structure, thus enabling reduction in size and weight of the gas generator and a significant reduction of manufacturing cost.

Also, a gas generator according to the present invention comprises a housing made of metal and having an initiator shell and a closure shell, a combustion chamber formed in the housing and packed with gas generant that generates high temperature gas by burning, a partition plate for partitioning the combustion chamber into two tiered chambers, a first filter member and a second filter member arranged around the first partitioned combustion chamber and the second partitioned combustion chamber respectively, a first igniter device and a second igniter device put in the initiator shell for igniting and burning the gas generant packed in the first combustion chamber and the second partitioned combustion chamber respectively, and a plurality of gas discharge holes formed in the housing for discharging gas generated in the first partitioned combustion chamber and the second partitioned combustion chamber, wherein either or both of the initiator shell and the closure shell forming the housing has a head portion of a semispherical form or an oval semispherical form and a cylindrical portion of a diameter D formed continuously from the head portion, and wherein a ratio H/D between the diameter D of the cylindrical portion and a distance H between bottoms of the head portions of the initiator shell and closure shell is in the range of 0.4-1.3, preferably in the form of 0.6-1.3, or further preferably in the range of 0.9-1.3. It is preferable that the diameter D is a diameter $D_1$ between outer sides of the closure shell.

This construction can provide the result that even when the housing is increased in inner pressure using a plurality of igniter devices, deformation of the housing can be suppressed, and as such can allow reduction in size and weight. As a result of this, when the gas generator is used for a passenger's seat, an occupied area of the gas generator required for placement in the instrument panel or the like is reduced, and as such can provide an increased degree of freedom of designing the instrument panel and the like.

In the gas generator of the present invention, a ratio $d_1/d_2$ between a minor axis $d_1$ and a major axis $d_2$ of the head portion of the initiator shell and closure shell is in the range of 1-0.02, preferably in the range of 1-0.1, or further preferably in the range of 1-0.3.

This construction enables the housing to sufficiently withstand the pressure increase caused by the gas generated in the housing, and as such can allow reduction in size and weight of the housing.

In the gas generator of the present invention, the head portion has a cross section of a generally semicircular shape or a generally semi-elliptical shape formed with at least three continuously extending straight lines.

This construction can facilitate the manufacturing of the housing.

In the gas generator of the present invention, the head portion has a semi-spherical form having a curvature radius R, and a ratio D/R between the diameter D of the cylindrical portion and the curvature radius R is in the range of 0.3-2, preferably in the range of 0.9-2, or further preferably in the range of 1.2-2. It is preferable that the diameter D is a length $D_1$ between outer sides of the closure shell. Also, R is a curvature radius of the semicircular head portion of the closure shell.

This construction enables the housing to sufficiently withstand the pressure increase caused by the gas generated in the housing. Also, this can facilitate the manufacturing of the housing, enabling reduction in size and weight of the housing.

In the gas generator of the present invention, the cylindrical portion formed in the closure shell has a height h of not less than 5 mm, preferable not less than 10 mm, or further preferably in the range of 10-30 mm.

This construction can allow the use of a seal strip as a seal member for sealing the gas discharge holes, and as such can allow the use of the seal strip as a rupture member.

In the gas generator of the present invention, the filter member is formed so that a portion thereof around the gas discharge holes is thicker than either of an upper end portion thereof and a lower end portion thereof.

This construction can prevent the filter member from being damaged at a portion thereof on which the gas is locally concentrated when discharged, and as such can allow the effective cooling of the gas generated in the housing. This can also allow the effective collection of residuals in the generated gas.

In the gas generator of the present invention, the gas discharge holes are arranged in zigzag on a surface of the housing.

This construction can prevent concentration of the gas generated in the housing when discharged, and as such can allow the effective use of the filter member.

In the gas generator of the present invention, the igniter device comprises an inner cylinder having a base and a plurality of enhancer holes therearound, enhancer agent packed in the inner cylinder, and an igniter placed in contact with the enhancer agent.

This construction can ensure that the enhancer agent is ignited by the operation of the igniter and then the frames from the igniter device are transmitted to the gas generant packed in the combustion chamber.

In the gas generator of the present invention, the enhancer holes are arranged in zigzag on a surface of the inner cylinder.

This construction enables a heat current spurted from the igniter device to be transmitted to the entire combustion chamber, thus enabling the effective burning of the gas generant.

In the gas generator of the present invention, the each enhancer hole is formed on a surface of cylindrical portion of the inner cylinder in the form of a slot long along an axial direction thereof.

This construction can provide adaptability to meet an axially expanded form of the combustion chamber.

In the gas generator of the present invention, the first igniter device and the second igniter device comprise first and second inner cylinders each having a base and a plurality of enhancer holes therearound, enhancer agent packed in the first inner cylinder and the second inner cylinder, and a first igniter and a second igniter both being placed in contact with the enhancer agent, respectively This construction can ensure that the enhancer agents packed in both inner cylinders are ignited by the operation of the igniter and then the frames from both igniter devices are transmitted to the gas generants packed in the both partitioned combustion chambers.

In the gas generator of the present invention, the enhancer holes are arranged in zigzag on surfaces of the first inner cylinder and the second inner cylinder respectively.

This construction enables heat currents spurted from the both igniter devices to be transmitted to the entire partitioned combustion chambers, thus enabling the effective burning of the gas generant packed in the both combustion chambers.

In the gas generator of the present invention, the each enhancer hole is formed on surfaces of cylindrical portions of the first inner cylinder and second inner cylinder in the form of a slot long along axial directions thereof.

This construction can provide adaptability to meet an axially expanded form of the combustion chamber.

In the gas generator of the present invention, either of the first inner cylinder and the second inner cylinder has a height enough to be located in the second combustion chamber which is an upper side chamber of the two partitioned chambers.

This construction can allow the placement of the igniter devices for burning the gas generants packed in the respective combustion chambers even when the first inner cylinder and the second inner cylinder are arranged in parallel.

In the gas generator of the present invention, the enhancer holes which are formed at either of the first inner cylinder and the second inner cylinder in the form of a cylinder having an extended axis, are formed to open only in the second combustion chamber which is located on an upper side of the two partitioned chambers.

This construction enables the gas generants packed in the respective partitioned combustion chambers to be burnt by their respective igniter devices provided in the respective combustion chambers. This enables the control of the generation of gas on a chamber-by-chamber basis.

In the gas generator of the present invention, the partition plate is held in sandwich relation between the initiator shell and the closure shell.

This construction enables the combustion chamber in the housing to be partitioned into two chambers reliably with a reduced number of components.

Also, a gas generator of the present invention comprises a housing made of metal and having an initiator shell and a closure shell, a combustion chamber formed in the housing and packed with gas generant that generates high temperature gas by burning, a filter member arranged around the combustion chamber, an igniter device put in the housing for igniting and burning the gas generant in the combustion chamber, and a plurality of gas discharge holes formed at the housing for discharging gas generated in the combustion chamber, wherein the housing has a generally spherical form.

Also, a gas generator of the present invention comprises a housing made of metal and having an initiator shell and a closure shell, a combustion chamber formed in the housing and packed with gas generant that generates high temperature gas by burning, a filter member arranged around the combustion chamber, an igniter device put in the housing for igniting and burning the gas generant in the combustion chamber, and a plurality of gas discharge holes formed at the housing for discharging gas generated in the combustion chamber, wherein the housing has a generally oval spherical form.

The gas generant packed in the gas generator of the present invention is in the form of a hollow body closed at both ends, or preferably in the form of a hollow cylinder closed at both ends.

This construction can produce the gas generator having the property that a weak output power is generated for a while after ignition and thereafter the output power is increased rapidly. This is because the gas generants having that form provides two ways of burning. First, only their outside surfaces are burnt until their closed ends are opened after ignited, so that the gas is generated at a gentle speed. After that, their outside surfaces and inside surfaces are both burnt, so that the gas is generated at a drastically increased speed. The gas generant of this form draws an S-shaped curve which is considered as a preferable, pressure-in-tank-time curve for reducing the risk harming of the airbag.

Also, since the gas generant of this form is closed at the opposite ends, it is high in compressive strength, as compared with the one of a single-hole cylinder form, and thus is not easily affected by vibration. Accordingly, the gas generator having the stable combustion properties can be obtained even after it is mounted on the automobile for a long period. Further, since the gas generant in the form of a hollow body closed at both ends has a high compressive strength, the gas generants can be packed in the combustion chamber with high density, thus producing the gas generator which is further reduced in size and weight.

In a passenger's seat airbag module of the present invention, the gas generator of the present invention is fixed to a gas generator holding portion of the airbag module by a flanged portion of the gas generator in such a condition that the gas discharge holes are located in the airbag.

This construction enables reduction in size of the airbag module, as compared with the conventional passenger's seat gas generator. That is to say, the conventional passenger's seat gas generator has a cylindrical shape and is fixed to the gas generator holding portion of the airbag module at both lengthwise ends thereof, with its cylindrical portion oriented horizontally. Since the gas discharged holes are in the cylindrical portion, the gas generator holding portion is so structured as to cover the entire gas generator. Also, since the passenger's seat gas generator is set in the instrument panel located in a place distant from a vehicle occupant, increase in amount of gas generated is required, and the cylindrical portion is also elongated. This inevitably leads to increase in size of the airbag module in which the conventional passenger's seat gas generator is assembled. In contrast to this, in the gas generator of the present invention, since the cylindrical portion having the gas discharge holes is oriented vertically and also is fixed to the gas generator holding portion of the airbag module via the flanged portion located at the cylindrical portion, there is no need for the gas generator holding portion to cover the entire gas generator. Also, the gas generator of the present invention is smaller in size than the conventional passenger's seat gas generator, and as such can allow reduction in size of the airbag module.

In addition, since there is no need to cover the entire gas generator, as the airbag module using the conventional passenger's seat gas generator does, the structure of the gas generator holding portion of the airbag module can also be simplified.

The airbag module of the present invention has a single gas generator.

BEST MODE FOR CARRYING OUT THE INVENTION

In the following, certain preferred embodiments of a gas generator according to the present invention will be described with reference to accompanying drawings.

Figure 1:
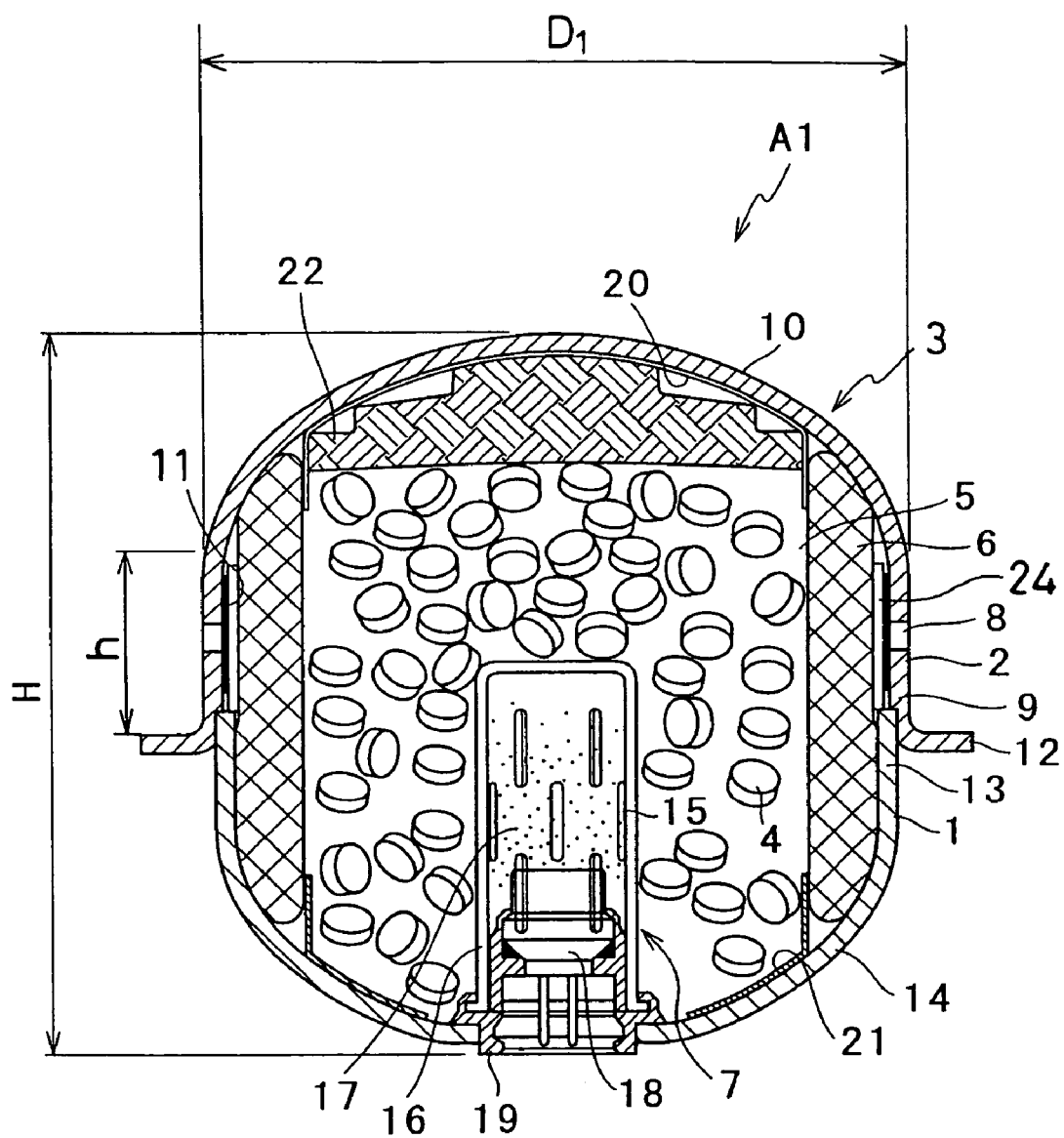
FIG. 1 is a sectional view of a gas generator of an example of an embodiment of the present invention.

Referring to FIG. 1, there is shown a sectional view of a gas generator A1 according to an example of an embodiment of the present invention. The gas generator A1 is used to expand and inflate an airbag. It comprises a housing 3 of a generally spherical form having an initiator shell 1 and a closure shell 2 which are made of metal, such as iron, stainless, aluminum, and steel, a combustion chamber 5 formed in the housing 3 and packed with gas generants 4 that generate high temperature gas by burning, a filter member 6 arranged around the combustion chamber 5, and an igniter device 7 secured in the housing 3 for igniting and burning the gas generants 4 in the combustion chamber 5.

The closure shell 2 comprises a cylindrical portion 9 having a diameter D, a head portion 10 of a semispherical form formed continuously from the cylindrical portion 9, and a flange portion 12 extending radially outwardly from the cylindrical portion 9. A plurality of gas discharge holes 8 are arranged preferably in zigzag on a surface of the cylindrical portion 9 (See FIG. 2). The gas discharge holes 8 arranged in zigzag allow the gas generated in the housing 3 to be discharged in a dispersed state without concentration. This prevents the filter member 6 from being damaged. Also, this can allow the filter member 6 to be used in a wide range, providing efficient use of the filter member 6. These gas discharge holes 8 may be formed to be arranged in rows, such as e.g. in two rows or three rows, as well as in zigzag. The same effect can be produced by such an alternative arrangement.

Figure 2:
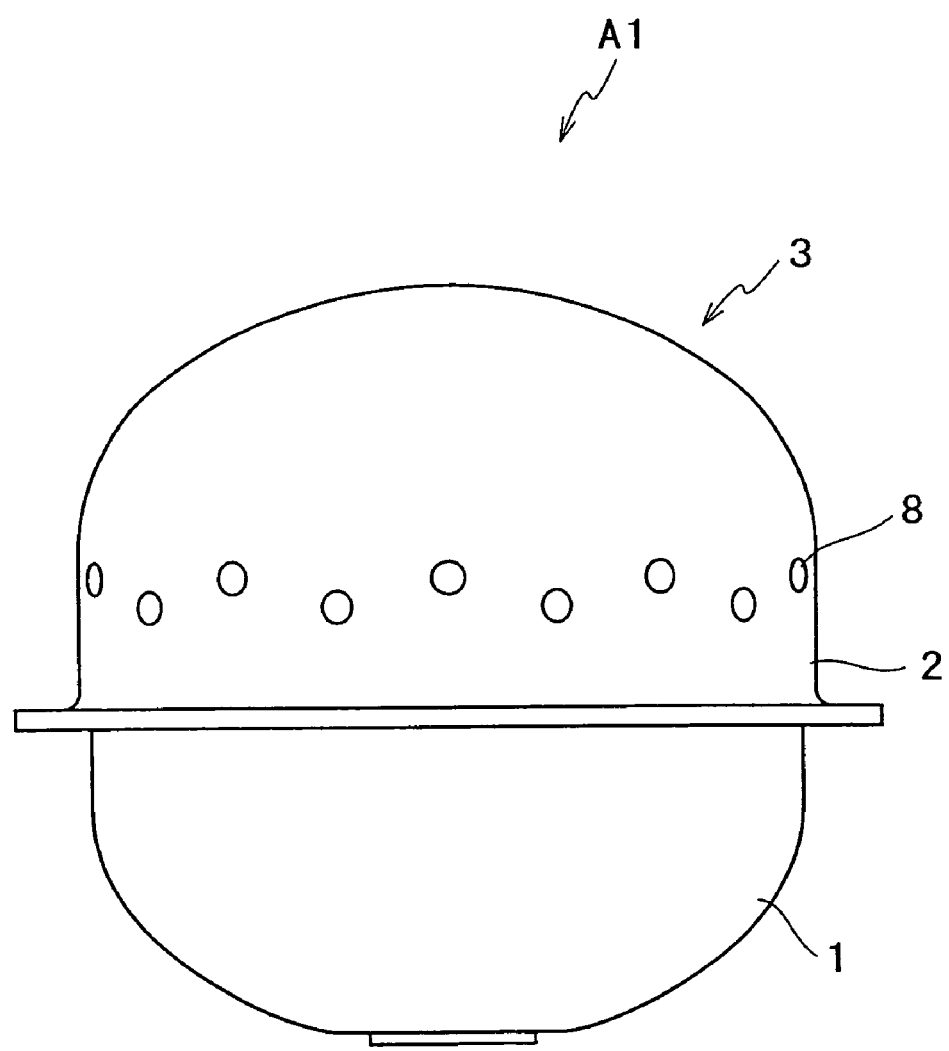
FIG. 2 an external view of the gas generator of the embodiment of the present invention.

Also, the gas discharge holes 8 may be arranged so that large diameter ones and small diameter ones can be arranged alternately, without being limited only to the ones having a uniform diameter. They may be arranged in several rows, such as three rows, four rows, etc., without being limited to the two-row arrangement along an axis direction of the cylindrical portion 9 as shown in FIG. 2. Also, they may be formed to have several different diameters, such as for example three or four different diameters, without being limited to two different diameters. Thus, controlling the diameter of the gas discharge holes 8 can produce a controlled inner pressure of the housing 3. For example, increasing the diameter of the gas discharge holes 8 can suppress a pressure rise in the housing 3. This can also allow reduction in wall thickness of the closure shell 2 and initiator shell 1 of the housing 3 in accordance with an inner pressure of the housing 3. Also, controlling the diameter of the gas discharge holes in accordance with the kind of the gas generant 4 used can produce controlled gas generation properties. The wall thickness of the initiator shell 1 and the closure shell 2 is preferably in the range of 1.5 mm to 3 mm.

A rupture member 11, such as a strip aluminum tape, is adhesively bonded to around the inside of the cylindrical portion 9 to close the gas discharge holes 8 so as to seal the interior of the combustion chamber 5 tightly. A height h of the cylindrical portion 9 is usually 5 mm or more, preferably in the range of 5-30 mm, or further preferably in the range of 10-30 mm. This is because this can allow the use of the rupture member 11 in the form of a strip tape and can also allow the adhesive bonding of the rupture member 11 with ease and reliability.

A ratio $d_1/d_2$ between a minor axis $d_1$ and a major axis $d_2$ of the head portion 10 is in the range of 1-0.02, preferably in the range of 1-0.1, or further preferably in the range of 1-0.3. When the minor axis-major axis ratio is in this range, the housing can sufficiently withstand the inner pressure resulting from the gas generated in the gas generator.

Figure 7:
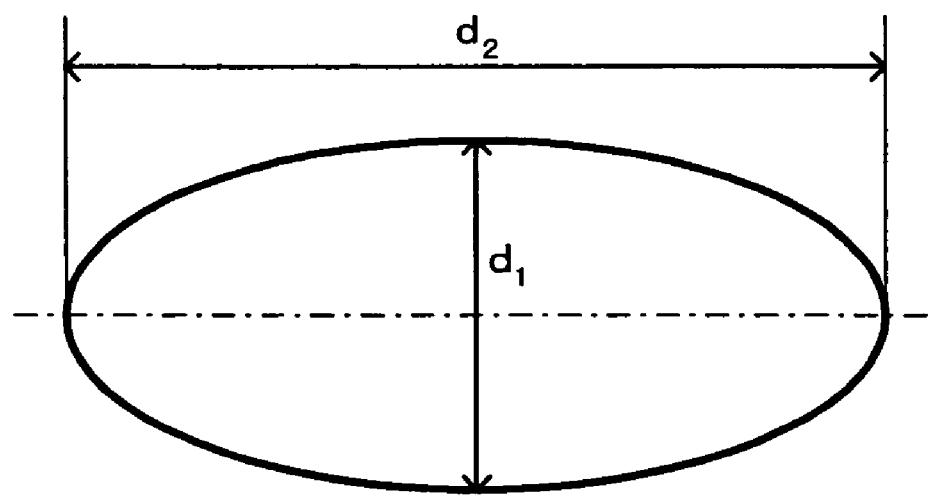
FIG. 7 is an illustration for explaining a relation between a minor axis $d_1$ and a major axis $d_2$ of a head portion of the gas generator according to the embodiment of the present invention.
Figure 8:
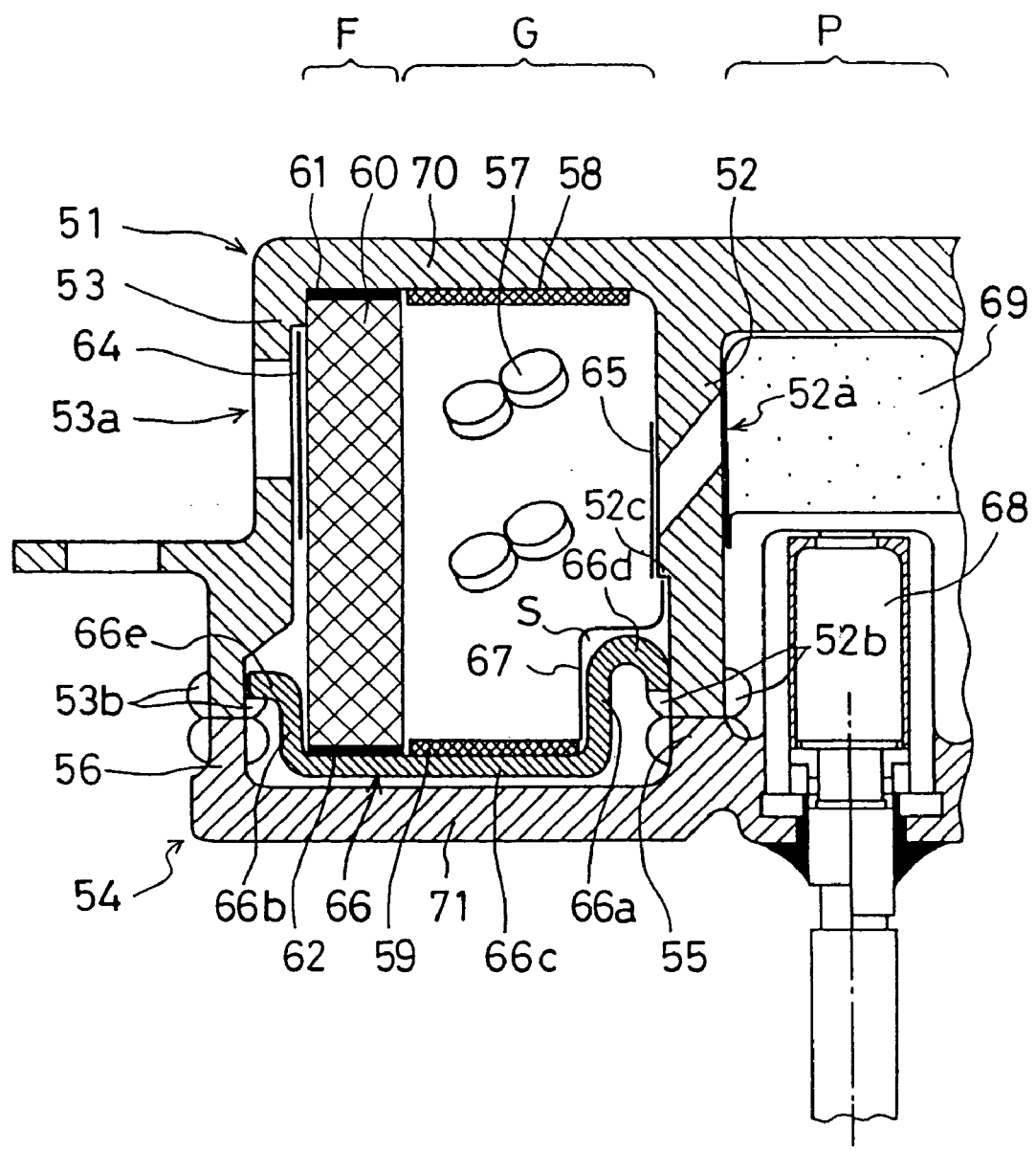
FIG. 8 is a sectional view showing an example of a conventional double cylinder type gas generator.
Figure 9:
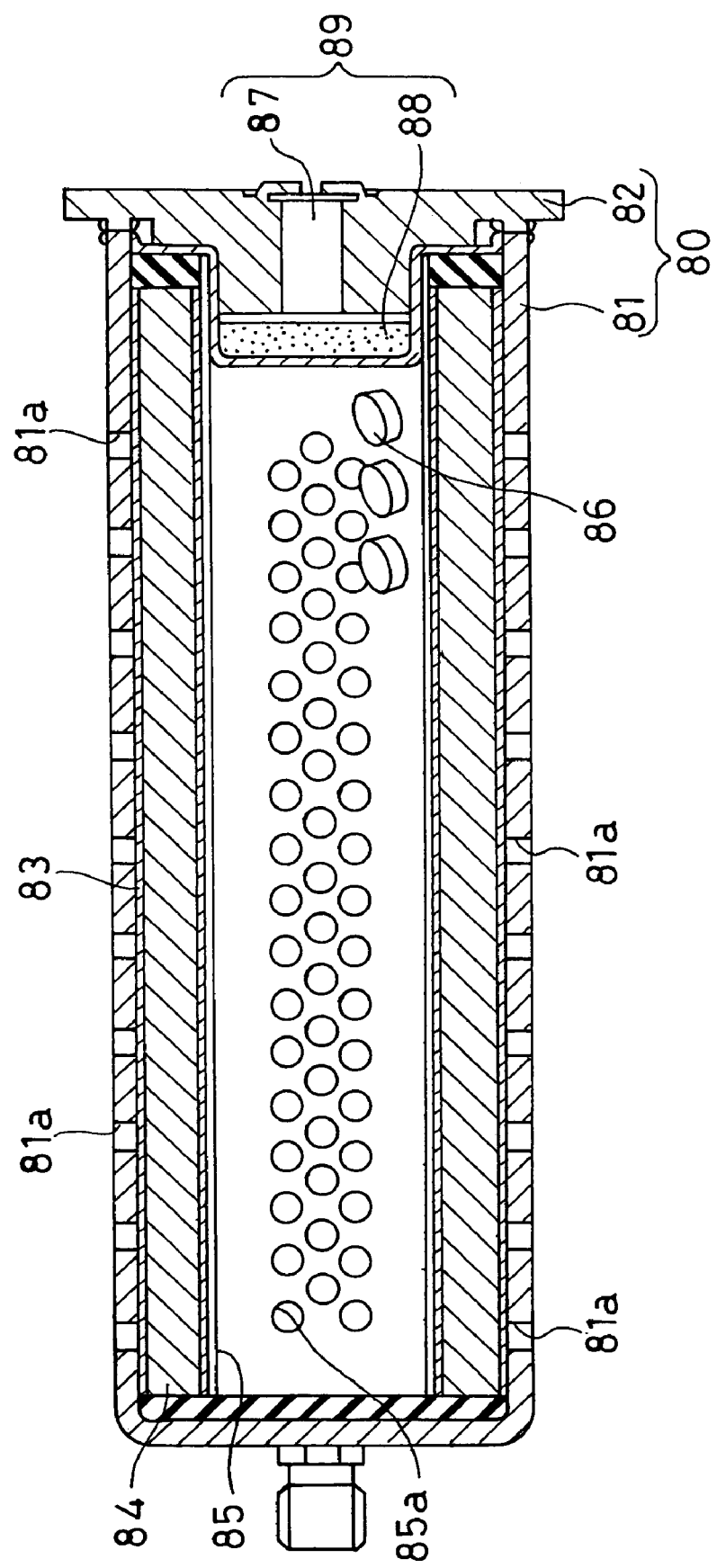
FIG. 9 is a sectional view showing an example of a conventional passenger's seat gas generator.

The head portion 10 has the minor axis $d_1$ and the major axis $d_2$ as shown in FIG. 7. Where the ratio $d_1/d_2$ is 1, the head portion 10 has a semispherical shape.

When the head portion 10 has a semispherical shape, it is preferable that a ratio D/R between a curvature radius R of the head portion 10 and a diameter D of the cylindrical portion 9 is usually in the range of 0.3-2, preferably in the range of 0.9-2, or further preferably in the range of 1.2-2. It is preferable that the diameter D of the cylindrical portion 9 has a value of a length $D_1$ shown in FIG. 1 as mentioned later. The curvature radius R is a curvature radius of a top portion of the head portion 10.

Forming the head portion in a semispherical shape or an oval semispherical shape can prevent local concentration of gas pressure generated in the combustion chamber 5 on any area of the head portion. Consequently, even when the gas generator is reduced in number of components and is simplified in structure, deformation of the housing at the time of the generation of gas can be suppressed to a very small range.

The initiator shell 1 joined to the closure shell 2 by pressure welding or welding comprises a cylindrical portion 13 and a head portion 14 of a semispherical form formed continuously from the cylindrical portion 13, as is the case with the closure shell 2 mentioned above. An igniter device 7 is provided in a center of the head portion 14. The provision of the cylindrical portion 13 can facilitate the joining of the initiator shell to the closure shell 2 by pressure welding, welding or the like. The cylindrical portion 13 is not indispensable, in other words, the initiator shell 1 can be formed by the head portion 14 only, as long as the initiator shell can be joined directly to the closure shell 2 at the ends of the head portion 14 by pressure welding, welding or the like.

The head portion 14 of the initiator shell 1 has a ratio $d_1/d_2$ between a minor axis $d_1$ and a major axis $d_2$ of the head portion 14 is in the range of 1-0.02, preferably in the range of 1-0.1, or further preferably in the range of 1-0.3, as is the case with the head portion 10 of the closure shell 2 mentioned above. This can provide the result that when the initiator shell 1 and the closure shell 2 are joined together, the housing 3 of a generally spherical shape or a generally oval semispherical shape can be formed.

The igniter device 7 provided in the center of the head portion 14 comprises an inner cylinder 16 having a based and a plurality of enhancer holes 15 around it, enhancer agent 17 packed in the inner cylinder 16, and an igniter 18 disposed in contact with the enhancer agent 17. The enhancer agent is used for ensuring the initiation of the burning of the gas generant. Composition comprising metal powder and an oxidizing agent typified by $B/KNO_3$ which is in common use, composition comprising a nitrogen-contained compound, an oxidizing agent and metal powder, or composition of gas generant may be used as the enhancer agent 17. The enhancer agent 17 contains the respective components in various ratios mentioned below. The enhancer agent 17 comprising metal powder and oxidizing agent preferably contains a 1-30 weight % metal powder component and a 70-95 weight % oxidizing agent component. The enhancer agent 17 comprising a nitrogen-contained compound, an oxidizing agent and metal powder preferably contains a 1-30 weight % metal powder component, a 0-40 weight % nitrogen-contained organic compound, and a 50-90 weight % oxidizing agent component. It may contain a 0-10 weight % molding binder, if necessary. The molding binder that may be generally used for the gas generant can be used. The enhancer agent 17 of powdery form, granular form, columnar form, sheet-like form, spherical form, single-pore cylinder form, multiple-pore cylinder form, tablet form, or in the form of a molded cylinder closed at both ends may be used.

The inner cylinder 16 is fixed to an igniter device holding portion 19 by a proper method, e.g., by crimping, and in turn to the initiator shell 1 by fixing the igniter device holding portion 19 to the head portion 14 by a proper method, e.g., by welding. The inner cylinder 16 is in the form of an elongate cylinder extending form one end of the combustion chamber 5 formed in the housing 3 to a nearly center of the combustion chamber 5. A plurality of enhancer holes 15 in the form of a circular hole or a slotted hole are formed around the inner cylinder 16 and are arranged usually in zigzag along an axial direction of the inner cylinder 16. It is preferable that the enhancer holes 15 are arranged in zigzag, as shown in FIG. 1, so that neighboring holes are not arranged in line with each other along the axial direction of the inner cylinder 16. This can allow the efficient spurting of the heat current spurted from the igniter device 7 into the entire combustion chamber 5.

A filter member 6 is provided in the housing 3 formed by the closure shell 2 and the initiator shell 1, extending along inner walls of the cylindrical portions 9, 13. The filter member 6 is produced at a low cost by forming e.g. a knitted wire sheet, a plain-woven wire sheet, or an aggregation of crimped metal wire rods or stamped metal wire rods into a circular shape. The filter member 6 is held on the inside wall of the housing 3 via holders 20, 21 provided on inner surfaces of the head portions 10, 14 of the closure shell 2 and the initiator shell 1, respectively.

A filter holding member 24 is arranged around the outside of the filter member 6 at a periphery thereof adjacent to the gas discharge holes 8. The filter holding member 24 is a plate-like member with a plurality of holes, which is called a punching metal, formed into a ring-like shape. This filter holding member 24 arranged around the outside of the filter member 6 at the periphery thereof adjacent to the gas discharge holes 8 restrains the filter member 6 from being deformed by the pressure of gas discharged.

The gas generants 4 are packed in a space around the inside of the filter member 6, and the space serves as the combustion chamber 5 where the gas generants 4 are burnt by the heat current from the igniter device 7.

The gas generants 4 that may be used include non-azide composition comprising e.g. fuel, an oxidizing agent, and additives (a binder, a slag forming agent, a combustion regulator).

The fuels that may be used include, for example, a nitrogen-contained compound. The nitrogen-contained compounds that may be used include, for example, a mixture of one or at least two materials selected from the group containing of triazole derivative, tetrazole derivative, guanidine derivative, azodicarbonamide derivative, hydrazine derivative, urea derivative, and ammine complex.

Concrete examples of the triazole derivative include, for example, 5-oxo-1,2,4-triazole and aminotriazole. Concrete examples of the tetrazole derivative include, for example, tetrazole, 5-aminotetrazole, aminotetrazole nitrate, nitroaminotetrazole, 5,5'-bi-1H-tetrazole, 5,5'-bi-1H-tetrazole diammonium salt, and 5,5'-azotetrazole diguanidium salt. Concrete examples of the guanidine derivative include, for example, guanidine, nitroguanidine, cyanoguanidine, triaminoguanidine nitrate salt, guanidine nitrate, aminoguanidine nitrate, and guanidine carbonate. Concrete examples of the azodicarbonamide derivative include, for example, azodicarbonamide. Concrete examples of the hydrazine derivative include, for example, carbohydrazide, carbohydrazide nitrate salt complex, dihydrazide oxalate, and hydrazine nitrate salt complex. Concrete examples of the urea derivative include, for example, biuret. Concrete examples of the ammine complex include, for example, hexammine copper complex, hexammine cobalt complex, tetrammine copper complex, and tetrammine zinc complex.

Of these nitrogen-contained compounds, one or at least two materials selected from the group consisting of tetrazole derivative and guanidine derivative is preferable. Particularly preferable are nitroguanidine, guanidine nitrate, cyanoguanidine, 5-aminoterazole, aminoguanidine nitrate and guanidine carbonate.

It is preferable that a mixing proportion of these nitrogen-contained compounds in the gas generant 4 is usually in the range of 20-70 weight %, or particularly preferably in the range of 30-60 weight %, depending on the number of carbon atoms, hydrogen atoms, and other atoms oxidized in the molecular formula. An absolute numerical value of the mixing proportion of the nitrogen-contained compounds varies depending on the kinds of oxidizing agent added to the gas generant. However, when an absolute numerical value of the mixing proportion of nitrogen-contained compounds is larger than the theoretical total oxidation amount, concentration of trace CO in the generated gas increases. On the other hand, when the absolute numerical value of the mixing proportion of nitrogen-contained compounds is equal to or less than the theoretical total oxidation amount, concentration of trace NOx in the generated gas increases. Accordingly, it is most preferable that the mixing proportion of nitrogen-contained compounds is in the range in which an optimum balance of the both can be made.

The oxidizing agent selected from at least one material of nitrate, nitrite and perchlorate, each including cation, selected from alkaline metal, alkaline earth metal, transition metal and ammonium is preferable. Although the oxidizing agents other than nitrate, i.e., nitrite and perchlorate, both of which are in heavy use as the oxidizing agent in the field of airbag inflator, can also be used, nitrate is preferably used from the viewpoints that the oxygen number in the molecules of nitrite is reduced, as compared with that of nitrate and that generation of finely-powdered mist that is easily released out from the airbag is reduced. Examples of the nitrate include, for example, sodium nitrate, potassium nitrate, magnesium nitrate, strontium nitrate, phase stabilized ammonium nitrate, and basic copper nitrate. Strontium nitrate, phase stabilized ammonium nitrate, and basic copper nitrate are preferably used.

It is preferable that a mixing proportion of the oxidizing agent in the gas generant is preferably in the range of 30-80 weight %, or particularly preferably in the range of 40-75 weight % with respect to the CO concentration and NOx concentration described above, depending on a kind and a quantity of nitrogen-contained compound used.

Any binder of the additives may be used as long as it does not exert a significant negative effect on the burning behavior of the gas generant. Examples of the binder include, for example, metal salt such as carboxymethyl cellulose; polysaccharide derivative such as methyl cellulose, hydroxylmethyl cellulose, cellulose acetate, cellulose propionate, cellulose acetate butyrate, nitrocellulose, microcrystalline cellulose, guar gum, polyvinyl alcohol, polyacrylamide, and starch; organic binder such as stearic acid salt; and inorganic binder such as molybdenum disulfide, synthetic hydroxytalcite, acid clay, talc, bentonite, diatomite, kaolin, silica, and alumina.

It is preferable that a mixing proportion of the binder is in the range of 0-10 weight % for a press molding, or in the range of 2-15 weight % for an extrusion molding. As a quantity of binder added increases, breaking strength of a molded product increases, but, the carbon atom number and hydrogen atom number in the composition increases along therewith, resulting in that concentration of trace CO gas which is an incomplete combustion product increases and quality of generated gas deteriorates. That also hinders the combustion of the gas generant. In view of this, a minimum amount of binder should preferably be used. Particularly a proportion of the binder in excess of 15 weight % requires increase of a relative abundance ratio of the oxidizing agent, causing reduction of a relative ratio of the gas generation compound and thus making it difficult to establish a practicable gas generation system.

Also, the slag forming agent may be mixed as the other components of additives than the binder. The slag forming agent is added, for the purpose of facilitating the filtration of the filter in the gas generator through the interaction with metal oxide produced from components of the gas generant, particularly from components of the oxidizing agent.

Examples of the slag forming agent include, for example, those selected from silicon nitride, silicon carbide, acid clay, silica, naturally occurring clay containing bentonite-based or kaolin-based aluminosilicate as a major component, artificial clay, such as synthetic mica, synthetic kaolinite and synthetic smectite, and talc which is one of hydrous magnesium silicate minerals. Of these slag forming agents, acid clay or silica, particularly acid clay, is preferably used. A mixing proportion of the slag forming agent is preferably in the range of 0-20 weight %, or particularly preferably in the range of 2-10 weight %. When an excessive amount of lag forming agent is added, a linear combustion velocity and gas generation efficiency are reduced, while on the other hand, when an even smaller amount of slag forming agent is added, the slag forming performances cannot be provided sufficiently.

Gas generant comprising 5-aminotetrazole, strontium nitrate, synthetic hydrotalcite and silicon nitride, or gas generant comprising guanidine nitrate, strontium nitrate, basic copper nitrate and acid clay can be cited as an example of a preferable combination of components of the gas generant.

Also, the combustion regulator may be added, if necessary. The fuel regulators that may be used include, for example, metal oxide, ferrosilicon, activated charcoal, graphite, and a chemically combined explosive, such as hexogen, octogen and 5-oxo-3-nitro-1,2,4-triazole. A mixing proportion of the combustion regulator is preferably in the range of 0-20 weight %, or particularly preferably in the range of 2-10 weight %. When an excessive amount of combustion regulator is added, the gas generation efficiency is reduced, while on the other hand, when an even smaller amount of combustion regulator is added, a sufficient combustion velocity cannot be obtained.

The gas generant of pellet form, columnar form, single-pore cylinder form, multiple-pore cylinder form, disk form, or in the form of a hollow cylinder closed at both ends may be used. Preferably, the gas generant in the form of a hollow cylinder closed at both ends may be used.

An example of the method of producing the gas generant in the form of a hollow cylinder closed at both ends is described. First, non-azide composition comprising the nitrogen-contained compound, oxidizing agent, slag forming agent, and binder is mixed by a V type mixer, a ball mill and the like. Then, water or solvent (e.g. ethanol) is added and mixed with the mixture being stirred, to thereby produce a clod of powdered mixture in a moist state. It should be noted here that the term "the moist state" means a state in which the clod of powdered mixture has some degree of plasticity, containing water or solvent in the range of 10-25%, or preferably in the range of 13-18 weight %. Thereafter, the clod of powdered mixture in the moisture state is extruded through an extruder (e.g. the one having a die and an inner-hole pin at its outlet port) as it is, to mold the clod into a hollow cylinder form having an outer diameter preferably in the range of 1.4 mm-4 mm, or further preferably in the range of 1.5 mm-3.5 mm, and an inner diameter preferably in the range of 0.3 mm-1.2 mm, or further preferably in the range of 0.5 mm-1.2 mm. Thereafter, the molded products in the form of a hollow cylinder are thrust at a uniform interval to produce the molded products in the form of the cylinder closed at both ends. Usually, after the molded products in the form of the hollow cylinder are thrust in a uniform interval, they are cut off in such a manner that they are folded at their closed dent portions. Thereafter, they are dried in two stages: they are dried at temperature usually in the range of 50-60° C. for 4-10 hours, first, and, then, dried at temperature usually in the range of 105-120° C. for 6-10 hours. The gas generants in the form of the cylinder closed at both ends thereof and having a space therein are produced in the manner described above. The gas generants thus produced have a length usually in the range of 1.5-8 mm, preferably in the range of 1.5-7 mm, or further preferably in the range of 2-6.5 mm.

The linear combustion velocity of the gas generants is measured in a constant pressure condition and is experientially determined in accordance with the formula of Vielle given below.

$$r = aP^n$$

where r represents a linear combustion velocity, a represents a constant, P represents a pressure, and n represents a pressure exponent. The pressure exponent n indicates a slope from a logarithmic plot in which the pressure taken as the X-axis is plotted against the log of combustion velocity taken as the Y-axis.

Preferably, the linear combustion velocity of the gas generant used for the gas generator of this embodiment is in the range of 3-60 mm/sec. or preferably in the range of 5-35 mm/sec. under the pressure of 70 kgf/cm$^2$ and the pressure exponent is in the range of n=0.90 or less, preferably in the range of n=0.75 or less, or particularly preferably in the range of n=0.60 or less.

The linear combustion velocity can be measured by the general measurement method including the strand burner method, the small motor method, and the sealed pressure container method. To be more specific, the combustion velocity is measured in a high-pressure container by the fuse cut-out method and the like using a test piece obtained by being press-molded in a prescribed size, followed by being coated with a restrictor. In this measurement, with the pressure in the high-pressure container as a parameter, the linear combustion velocity is measured and then the pressure exponent is determined from the formula of Vielle above.

Cushioning members 22 are provided in the combustion chamber 5 on a side thereof on which the head portion 10 of the closure shell 2 is. These cushioning members 22 are formed, for example, of ceramics fibers, silicon foam and the like, to prevent damage, such as crack, of the gas generants 4 packed in the combustion chamber 5 caused by vibration and the like.

The housing 3 formed by joining together the initiator shell 1 and the closure shell 2 has a ratio H/D between a distance H between bottoms of the head portions 14, 10 of the initiator shell 1 and the closure shell 2 and the diameter D of the cylindrical portion 9 which is set to be usually in the range of 0.4-1.3, preferably in the range of 0.6-1.3, or further preferably in the range of 0.9-1.3. The setting of the H/D ratio in this range enables reduction in size and weight of the gas generator, while providing to the gas generator sufficient strength to withstand the pressure resulting from the gas generated in the combustion chamber 5.

In addition, the setting of the ratio H/D of the cylindrical portion 9, 13 to the diameter D to be in the range of 0.4-1.3, preferably in the range of 0.6-1.3, or further preferably in the range of 0.9-1.3 can allow the gas generants 4 to be packed with ease as well as with high efficiency, even when the gas generator is reduced in size and weight. Incidentally, for example when the gas generator according to this embodiment is used with the automobile passenger's seat airbag, the H is preferably set to be in the range of not less than 45 mm to not more than 90 mm. Thus, even when the gas generator is reduced in size and weight, it can be packed with an equal quantity of gas generant to conventional, and as such can prevent reduction in amount of generated gas. Again, the gas generator can be reduced in size and weight while generating an equal quantity of gas to conventional. This is because since the housing includes the head portion 14, 10 formed as described above, the housing does not have any interior area which is subjected to a local pressure concentration and therefore can well withstand the high pressure, suppressing deformation of the housing at the time of generation of gas to a very small range.

The gas generator A1 thus constructed in the form of a single-cylinder gas generator is assembled mainly in the airbag module secured in the instrument panel on the passenger seat side.

The assembling of the gas generator in the airbag module can be effected by fixing the flange 12 to the module. Thus, the gas generator of the invention does not require any complicated work in assembling in the module, as the conventional cylindrical gas generator used for the passenger's seat airbag does, enabling a very easy assembling of the gas generator in the module. Also, as a result of the gas generator being reduced in size and weight, an occupied area of the gas generator required for placement in the instrument panel is reduced. This can provide an increased degree of freedom of designing the instrument panel.

Then, after the gas generator A1 is assembled in the airbag module, the igniter device 7 of the gas generator A1 is connected to a connector on the vehicle side, not shown. The gas generator A1 can be used with the airbag on the driver's side as well.

In the gas generator A1 connected to the automobile in the manner as described above, for example when automobile collision is detected by the collision sensor, the igniter device 7 is operated through a squib ignition circuit connected to the igniter device 7, to burn the gas generants 4 in the combustion chamber 5 to thereby generate high temperature gas. Although the pressure in the interior of the combustion chamber 5 increases at that time, since the housing 3 has a semispherical form, the housing 3 has a sufficient strength to withstand the pressure increase in the combustion chamber 5, suppressing deformation of the housing to a very small range. Then, the high temperature gas generated in the combustion chamber 5 passes through the filter member 6, bursts the rupture member 11, and is discharged from the gas discharge holes 8. When the high temperature gas passes through the filter member 6, the gas is cooled down and its residual is collected through the filter member 6. Also, since the filter member 6 is arranged to cover nearly the entire area of the combustion chamber 5, an effective use of the filter member 6 can be made. This enables the effective cooling of the gas and the effective collection of the residual of the gas before discharged.

Figure 3:
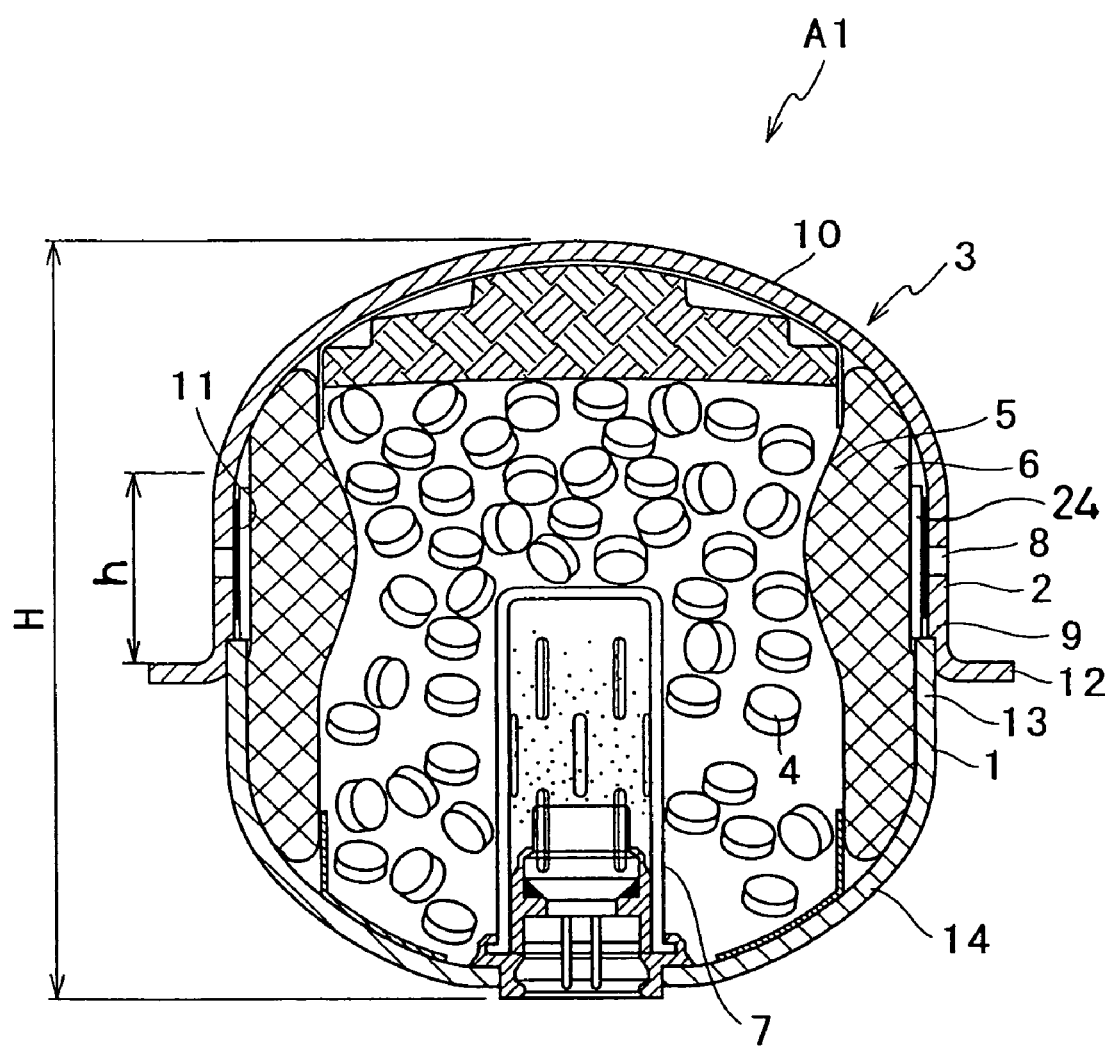
FIG. 3 is a sectional view of the gas generator of another embodiment of the present invention.

The gas generator according to the present invention is not limited to the above-illustrated example of the first embodiment. For example, as shown in FIG. 3, the filter member 6 placed in the combustion chamber 5 may be modified to have a larger wall thickness at a portion thereof around the gas discharge holes 8 than at either of an upper end portion thereof and a lower end portion thereof. Also, the filter member 6 may be tapered to gradually become reduced in wall thickness from its upper end to its lower end, though not shown.

This modification of the filter member 6 to have a larger wall thickness at a portion thereof around the gas discharge holes 8 than at either of an upper end portion thereof and a lower end portion thereof can produce the result that even when the gas generated in the combustion chamber 5 is locally concentrated on a portion of the filter member around the gas discharge holes 8 when discharged, the damage to the filter member 6 can be restrained. This can prevent damage to the functions of the filter member 6 of cooling the gas and collecting the residual.

Figure 4:
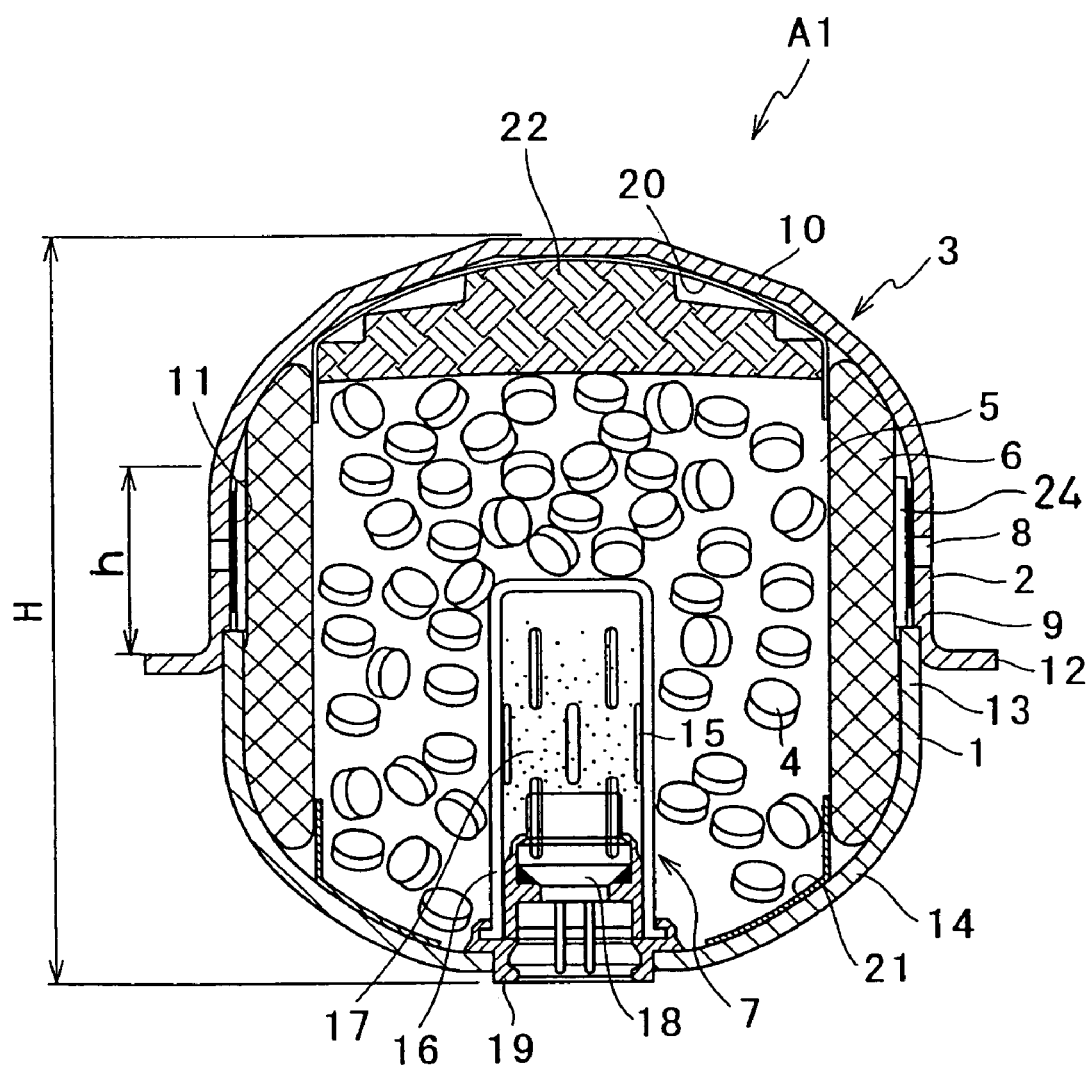
FIG. 4 is a sectional view of the gas generator of another embodiment of the present invention.

Also, either or both of the head portions 10, 14 of the closure shell 2 and the initiation shell 1 may be formed to have a cross section of a generally semicircular form or a generally semi-elliptical form formed by three or more continuously extending straight lines, as shown in FIG. 4. This configuration can suppress the stress concentration even when the pressure in the housing increases, and as such can also allow reduction in size and weight of the housing. This can also facilitate the manufacturing of the housing.

Alternatively, one of the head portion 14 of the initiator shell 1 and the head portion 10 of the closure shell 2 may be formed to have a cross section of a semicircular form and the other may be formed to have a cross section of a semi-elliptical form, though not shown.

Figure 5:
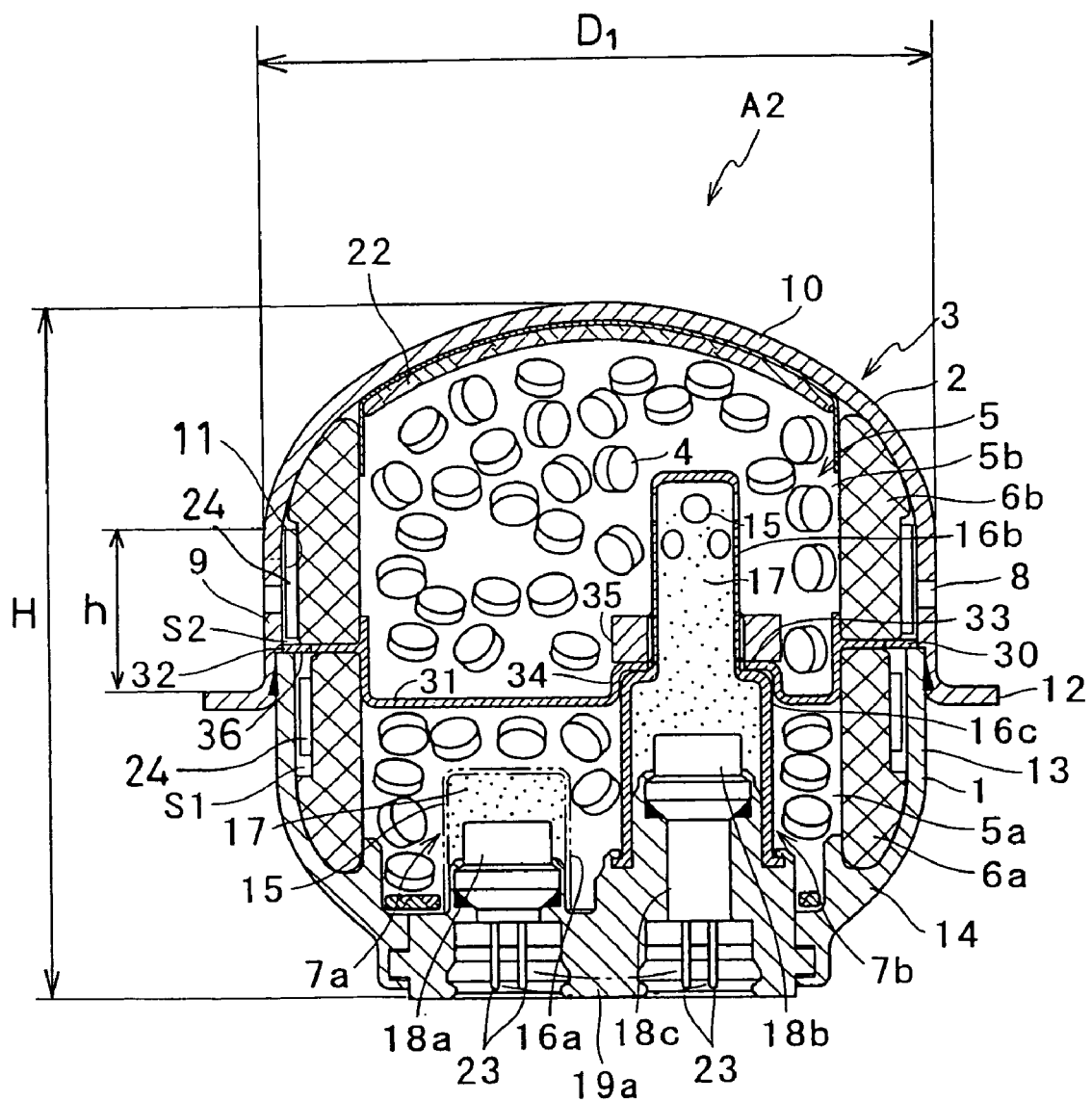
FIG. 5 is a sectional view of the gas generator of another embodiment of the present invention.

Additionally, the gas generator according to the present invention may be constructed so that the interior of the housing 3 is partitioned into two tiered spaces by e.g. a partition plate 30, as shown in FIG. 5, without being limited to the example and variants of the embodiment illustrated above. The same reference numerals/characters in FIG. 5 as those in FIGS. 1-4 refer to corresponding parts, and detailed description thereon is omitted.

The gas generator A2 shown in FIG. 5 comprises a metal housing 3 formed by an initiator shell 1 and a closure shell 2, a combustion chamber 5 formed in the housing 3 and packed with gas generants 4 that generate high temperature gas by burning, and a partition plate 30 for partitioning the combustion chamber 5 into two tiered chambers. It also comprises first and second filter members 6a and 6b arranged around the inside of the first and second combustion chambers 5a and 5b partitioned by the partition plate 30, first and second igniter devices 7a, 7b secured to the initiator shell 1 for igniting and burning the gas generants 4 packed in the first and second combustion chambers 5a, 5b partitioned by the partition plate 30, and a plurality of gas discharge holes 8 formed in the housing 3 for discharging the gas generated in the first and second partitioned combustion chambers 5a, 5b therefrom.

Either or both of the initiation shell 1 and the closure shell 2 forming the housing 3 have semicircular or semi-elliptical head portions 14, 10, and cylindrical portions 13, 9 having a diameter D formed continuously from the head portions 14, 10. The ratio H/D between the distance H between bottoms of the head portions 14, 10 of the initiator shell 1 and closure shell 2 and the diameter D of the cylindrical portion 9 is usually in the range of 0.4-1.3, preferably in the range of 0.6-1.3, or further preferably in the range of 0.9-1.3. The diameter D of the cylindrical portion 9 is preferably taken as a length $D_1$ shown in FIG. 5, as mentioned later.

The partition plate 30 for partitioning the combustion chamber 5 in the housing 3 into the two tiered chambers of the first and second combustion chamber 5a, 5b has a partition portion 31 and a flanged portion 32 formed by pressing a sheet of plate material, as shown in FIG. 5. The partition portion 31 has a hole 33 for insertion of a second inner cylinder 16b of a second igniter device 7b mentioned later. A stepped portion 34 is formed around the hole 33. The second cylinder 16b is restrained with its stepped portion 16c held by the stepped portion 34. The partition plate 30 is fixed with its flanged portion 32 held in sandwich relation between joining portions of the initiator shell 1 and the closure shell 2.

The first igniter device 7a and the second igniter device 7b for burning the gas genetants 4 packed in the combustion chambers 5a, 5b are provided in the two-tiered, first and second combustion chambers 5a, 5b defined by the partition plate 30, respectively.

The first igniter device 7a provided in the first combustion chamber 5a formed on the lower side of the housing 3 comprises a first cylinder 16a having a base and a plurality of enhancer holes 15 formed therearound, enhancer agent 17 packed in the first inner cylinder 16a, and a first igniter device 18a placed in contact with the enhancer agent 17.

The first inner cylinder 16a is in the form of a closed-end cylinder having the same diameter and is fixed to an igniter device holding portion 19a by a proper method, e.g., by crimping. The first inner cylinder 16a is fixed to the initiator shell 1 by fixing the igniter device holding portion 19a to the head portion 14 by a proper method, e.g., by welding. Also, the first inner cylinder 16a has a cylindrical form extending from one end portion of the first combustion chamber 5a formed at a lower side of the interior of the housing 3 to nearly a center portion of the first combustion chamber 5a. A plurality of enhancer holes 15 in the form of a slotted hole or a circular hole are formed around the first inner cylinder 16a and are arranged usually in zigzag along an axial direction of the first inner cylinder 16a. It is preferable that the enhancer holes 15 are arranged in zigzag so that neighboring holes are not arranged in line with each other along the axial direction of the first inner cylinder 16a. This can allow the efficient spurting of the heat current spurted from the first igniter device 7a into the entire first combustion chamber 5a.

The second igniter device 7b provided in the second combustion chamber 5b formed on the upper side of the housing 3 for burning the gas generant 4 in the second combustion chamber 5b comprises a second cylinder 16b having a base and a plurality of enhancer holes 15 formed therearound, enhancer agent 17 packed in the second inner cylinder 16b, and a second igniter device 18b placed in contact with the enhancer agent 17.

The second inner cylinder 16b is in the form of a closed-end cylinder having a small diameter portion and a large diameter portion different in diameter from each other and a stepped portion 16c and is fixed to the igniter device holding portion 19a by a proper method, e.g., by crimping. The second inner cylinder 16b is fixed to the initiator shell 1 by fixing the igniter device holding portion 19a to the head portion 14 by a proper method, e.g., by welding. Also, the second inner cylinder 16b has a cylindrical form extending from one end portion of the first combustion chamber 5a at a lower side of the interior of the housing 3 formed by the partition plate 30 to nearly a center portion of the second combustion chamber 5b. A plurality of enhancer holes 15 in the form of a slotted hole or a circular hole are formed around the inner cylinder on the second combustion chamber 5b side and are arranged usually in zigzag along an axial direction of the inner cylinder. It is preferable that the enhancer holes 15 are arranged in zigzag on a surface of the second inner cylinder 16b so that neighboring holes are not arranged in line with each other along the axial direction. This can allow the efficient spurting of the heat current spurted from the second igniter device 7b into the entire combustion chamber 5.

Also, the second inner cylinder 16b is fixed to the partition plate 30 by crimping, screwing, and the like. In this embodiment, the second inner cylinder 16b is screw-threaded around the outside surface of the small diameter portion and is threadedly engaged with a nut 35, so that the second inner cylinder 16b is fixed to the partition wall 30 with the stepped portion 34 formed in the partition wall 30 held in sandwich relation between the nut 35 and the stepped portion 16c. This can ensure that fixing to keep the second inner cylinder in the restrained state even at the operation of the second igniter 18b. In addition, this can also ensure the fixing of the partition plate 30 to restrain deformation of the partition plate 30 caused by the pressure increase at the time of generation of gas in the first combustion chamber 5a. This can prevent the gas from being bypassed from the first combustion chamber gas to the second combustion chamber 5b.

The igniter device holding portion 19a is formed to have a larger wall thickness at a portion thereof where the second igniter device 7b for burning the gas generants 4 packed in the second combustion chamber 5b is fixed than at a portion thereof where the first igniter device 7a is fixed. This can bring the carrying and fixing position of the second igniter 18b near the second combustion chamber 5b, to increase the combustion efficiency of the gas generants 4 of the second combustion chamber 5b. Also, a closing plug 18c of the second igniter 18b carried and fixed in the large thickness portion of the igniter device holding portion 19a is formed to have a long shaft length, to correspond in length of electrode pins 23 projecting from the closing plug 18c to that of the first igniter 18a. This can provide increased strength of the second igniter 18b. This can also eliminate the need to change a shape of a connector of a collision sensor and the like, not shown, connected to the electrode pins 23.

A first filter member 6a and a second filter member 6b are provided in the first combustion chamber 5a and the second combustion chamber 5b defined by the partition plate 30, extending along inner walls of the cylindrical portions 13, 9. These filter members 6a, 6b are produced at a low cost by forming e.g. a knitted wire sheet, a plain-woven wire sheet, or an aggregation of crimped metal wire rods or stamped metal wire rods into a circular shape, as is the case with the filter member previously mentioned.

The gas generator A2 thus constructed, serving as a double-cylinder gas generator, is assembled mainly in the airbag module secured in the instrument panel on the passenger's seat side. The first igniter device 7a and the second igniter device 7b of the gas generator A2 are connected to connectors on the vehicle side, not shown, respectively. This gas generator is also applicable to the airbag on the driver's seat side in that it can be reduced in size and weight.

For example when automobile collision is detected by the collision sensor, the gas generator A2 thus connected to the automotive vehicle put the first igniter device 7a into operation via a squib ignition circuit connected to the first igniter device 7a on the first combustion chamber 5a side packed with a smaller amount of gas generant 4, first. This causes the gas generant 4 packed in the first combustion chamber 5a to be burnt, thereby generating high temperature gas. The high temperature gas generated in the first combustion chamber 5a passes through the first filter member 6a, first. Then, after it is temporarily stored in a space S1 formed between the first filter member 6a and the cylindrical portion 13, it passes through a gas passage 36 formed in the flanged portion 32 of the partition plate 30 and is discharged from the gas discharge holes 8 arranged on s surface of the cylindrical portion 9. The gas passage 36 is formed by a cutout formed at an end of the flanged portion 32, though it may be formed by a through hole extending through the flanged portion 32.

Then, the second igniter device 7b is put into operation in a certain time difference. This causes the gas generants 4 in the second combustion chamber 5b to be burnt, generating the high temperature gas. The high temperature gas generated in the second combustion chamber 5b passes through the second filter member 6b, first. Then, after it is mixed with the high temperature gas from the first combustion chamber 5a in a space S2 formed between the second filter member 6b and the cylindrical portion 9, the mixed gas is discharged from the gas discharge holes 8 formed in the cylindrical portion 9, to expand and inflate the airbag rapidly. Although the pressure in the interior of the housing 3 increases at that time, since the housing 3 has a generally spherical form, the housing 3 has a sufficient strength to withstand the pressure increase in the housing 3, suppressing deformation of the housing to a very small range. Then, the high temperature gas generated in the respective combustion chambers 5a, 5b passes through the filter members 6a, 6b placed in the respective combustion chambers 5a, 5b, bursts the rupture member 11, and is discharged from the gas discharge holes 8. It is to be noted here that the ignition order of the first igniter device 7a and the second igniter device 7b may be changed so that the second igniter device 7b can be put in operation, followed by the operation of the first igniter device 7a. Further, a selective control of the operation order of the igniter devices may be made, such as, for example, igniting the both igniter devices 7a, 7b simultaneously, in accordance with the collision shock pattern.

Figure 6:
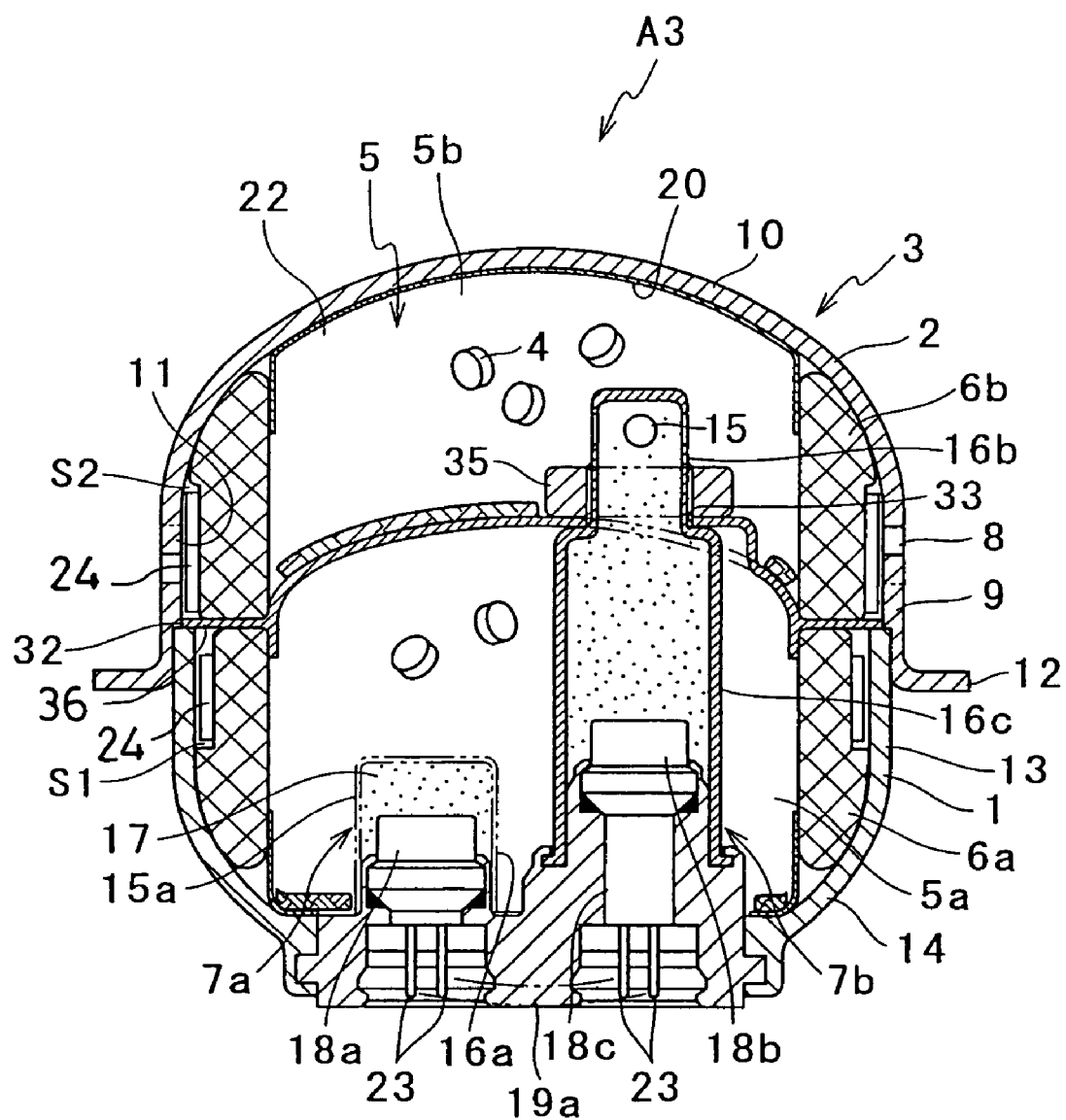
FIG. 6 is a sectional view of the gas generator of another embodiment of the present invention.

The gas generator according to the present invention may be varied as shown in FIG. 6. The gas generator A3 shown in FIG. 6 is a variant of the gas generator A2 of FIG. 5 wherein the partition plate 30 for partitioning the combustion chamber 5 in the interior of the housing 3 into the two chambers is changed in shape so that it has a spherical shape or an oval spherical shape protruding toward the second combustion chamber 5b on the upper side. This can provide the result that even when an increased amount of gas generant 4 is packed in the first combustion chamber 5a, deformation of the partition plate 30 is suppressed, and as such can prevent the gas from being bypassed from the first combustion chamber 5a to the second combustion chamber 5b by the deformation of the partition plate 30.

As seen from the above, even when a plurality of igniter devices are used, since the housing has a generally spherical form or a generally oval spherical form, the housing can be given an increased strength to sufficiently withstand the pressure increase even when reduced in size and weight.

Also, the airbag module of the present invention is so designed that the gas generator can be fixed to the airbag module through the flanged portion 12. The airbag module of the present invention is placed usually in the passenger's seat instrument panel, and a single gas generator is built in the airbag module of the present invention.

EXAMPLES

In the following, the gas generator according to the present invention is described with reference to Examples.

In the gas generator shown in FIGS. 1 and 2, a stainless material having a thickness of 2 mm was pressed to form the closure shell having the following dimensions: 75 mm in distance H between the bottoms of the head portions 10, 14; 70 mm in diameter $D_1$ of the cylindrical portion 9; 16 mm in h; 70 mm in major axis $d_2$ of the head portion 10 of the closure shell 2; 45 mm in minor axis $d_1$ of the same; and 45 mm in curvature radius R of the head portion on the closure shell side. Also, a stainless material having a thickness of 2 mm was pressed to form the initiator shell 1 having the following dimensions: 67 mm in major axis $d_2$ of the head portion 14; 42 mm in minor axis $d_1$ of the same; and 20 mm in curvature radius r of the head portion on the initiator shell side. Then, the igniter device 7 and the filter member 6 were placed in sequence in the initiator shell 1. Then, the gas generants 4 was packed in the inside of the filter member 6 and thereafter the cushioning members 22 are placed. Thereafter, the initiator shell 1 was fitted with the closure shell 2. Then, the initiator shell 1 and the closure shell 2 were joined together by laser welding to thereby produce the gas generator.

Reference Example

Example of manufacturing of gas generant of a form of a hollow body closed at both ends used with the gas generator:

3 weight % ethanol and 13 weight % water were added to composition comprising a mixture of 43.5 weight % guanidine nitrate, 25 weight % strontium nitrate, 25 weight % basic copper nitrate, 2.5 weight % acid clay, and 4 weight % polyacrylamide and mixed and kneaded to thereby produce a kneaded clod. The kneaded clod was extruded at an extrusion pressure of 8 MPa via an extruder having a die of an inner diameter of 2 mm and an inner-hole pin of an outer diameter of 0.5 mm at an outlet port thereof. Then, the molded product as extruded in a rod-like form was fed into between molding teeth, while being taken off by a take-off belt, to form depressed portions in the molded product at regular interval of 4.4 mm by convex teeth. Then, the molded product was folded at the depressed portions to cut it off. Thereafter, they were dried at 55° C. for 8 hours and then were dried at 110° C. for 8 hours. The gas generants were formed in this manner.

CAPABILITY OF EXPLOITATION IN INDUSTRY

The gas generator according to the present invention is constructed as described above. Since the housing is formed in a generally spherical shape or a generally oval spherical shape, the housing can well withstand an increased inner pressure of the housing resulting from the gas generated by the burning of the gas generants, even when the gas generator is reduced in number of components and simplified in structure. This can suppress deformation of the housing at the time of generation of gas to a very small range. This can provide a reduced number of components and a simplified structure, thus enabling reduction in size and weight of the gas generator. This can also provide the effect of providing a significant reduction of manufacturing cost, while keeping the safety of the gas generator.

The invention claimed is:

1. A gas generator, comprising:
   a housing made of metal and including an initiator shell and a closure shell;
   at least one combustion chamber formed in the housing and configured to be packed with a gas generant that generates a high temperature gas by burning;
   at least one filter member arranged around the at least one combustion chamber;
   at least one igniter located in the housing and configured to ignite and burn the gas generant in the at least one combustion chamber; and
   a plurality of gas discharge holes formed in the housing and configured to discharge gas generated in the at least one combustion chamber, wherein
   at least one of the initiator shell and the closure shell forming the housing includes a head portion of a semi-spherical form or an oval semispherical form and a cylindrical portion having a diameter D formed continuously from the head portion,
   a ratio H/D between the diameter D of the cylindrical portion and a distance H between bottoms of the head portions of the initiator shell and closure shell is in a range of 0.6-1.3, and
   the at least one filter member is configured so that a portion thereof around the gas discharge holes bulges inward to make the portion thick to prevent the at least one filter member from being damaged, and the filter member is configured so that, at each position along an axial direction of the gas generator, a thickness of the filter member is substantially the same along a circumference of the filter member.

2. The gas generator according to claim 1, wherein a ratio $d_1/d_2$ between a minor axis $d_1$ and a major axis $d_2$ of the head portion of the initiator shell or the closure shell is in a range of 1-0.02.

3. The gas generator according to claim 1, wherein the head portion has a cross section of a generally semicircular shape or a generally semi-elliptical shape formed with at least three continuously extending straight lines.

4. The gas generator according to claim 1, wherein the head portion has a semi-spherical form having a curvature radius R, and a ratio D/R between the diameter D of the cylindrical portion and the curvature radius R is in a range of 0.3-2.

5. The gas generator according to any one of claims 1 to 4, wherein the diameter D is a diameter $D_1$ between outside surfaces of the closure shell.

6. The gas generator according to claim 1, wherein the cylindrical portion formed in the closure shell has a height h in a range of 5-30 mm.

7. The gas generator according to claim 1, wherein the gas discharge holes are arranged in a zigzag pattern on a surface of the housing.

8. The gas generator according to claim 1, wherein the at least one igniter device includes an inner cylinder having a base and a plurality of enhancer holes therearound, an enhancer agent packed in the inner cylinder, and an igniter placed in contact with the enhancer agent.

9. The gas generator according to claim 1, wherein
   the igniter device includes an inner cylinder having a base and a plurality of enhancer holes therearound, an enhancer agent packed in the inner cylinder, and an igniter placed in contact with the enhancer agent, and
   the enhancer holes are arranged in a zigzag pattern on a surface of the inner cylinder.

10. The gas generator according to claim 1, wherein
    the igniter device includes an inner cylinder having a base and a plurality of enhancer holes therearound, an enhancer agent packed in the inner cylinder, and an igniter placed in contact with the enhancer agent, and
    each of the enhancer holes is formed on a surface of a cylindrical portion of the inner cylinder in a form of a slot long along an axial direction thereof.

11. The gas generator according to claim 1, wherein
    the igniter device includes an inner cylinder having a base and a plurality of enhancer holes therearound, an enhancer agent packed in the inner cylinder, and an igniter placed in contact with the enhancer agent, and
    the enhancer holes are arranged in a zigzag pattern on a surface of a cylindrical portion of the inner cylinder in a form of slots along an axial direction thereof respectively.

12. The gas generator according to of claim 1, wherein the gas generant is in the form of a hollow body closed at both ends.

13. The gas generator according to of claim 1, which is designed for a passenger's seat.

14. A passenger's seat airbag module to which the gas generator according to of claim 1 is fixed through a flanged portion.

15. The gas generator according to claim 1, wherein a thickest portion of the filter member is opposed to an entirety of the plurality of gas discharge holes such that a portion of the filter member that is directly below and in contact with the thickest portion of the filter member, but is not opposed to the plurality of gas discharge holes, is less thick than the thickest portion.

16. A gas generator, comprising:
    a housing made of metal and including an initiator shell and a closure shell;
    a combustion chamber formed in the housing and configured to be packed with a gas generant that generates a high temperature gas by burning;
    a partition plate configured to partition the combustion chamber into two tiered chambers;
    a first filter member and a second filter member arranged around the first partitioned combustion chamber and the second partitioned combustion chamber respectively;
    a first igniter device and a second igniter device located in the initiator shell and configured to ignite and burn the gas generant packed in the first partitioned combustion chamber and the second partitioned combustion chamber respectively; and
    a plurality of gas discharge holes formed in the housing and configured to discharge gas generated in the first partitioned combustion chamber and the second partitioned combustion chamber, wherein
    at least one of the initiator shell and the closure shell forming the housing includes a head portion of a semi-spherical form or an oval semispherical form and a cylindrical portion of a diameter D formed continuously from the head portion,
    a ratio H/D between the diameter D of the cylindrical portion and a distance H between bottoms of the head portions of the initiator shell and closure shell is in a range of 0.6-1.3, and
    at least one of the filter members is configured so that a portion thereof around the gas discharge holes bulges inward to make the portion thick to prevent the at least one filter member from being damaged, and the filter member is configured so that, at each position along an axial direction of the gas generator, a thickness of the filter member is substantially the same along a circumference of the filter member.

17. The gas generator according to claim 16, wherein a ratio $d_1/d_2$ between a minor axis $d_1$ and a major axis $d_2$ of the head portion of the initiator shell or closure shell is in a range of 1-0.02.

18. The gas generator according to claim 16, wherein the head portion has a cross section of a generally semicircular shape or a generally semi-elliptical shape formed with at least three continuously extending straight lines.

19. The gas generator according to claim 16, wherein the head portion has a semi-spherical form having a curvature radius R, and a ratio D/R between the diameter D of the cylindrical portion and the curvature radius R is in a range of 0.3-2.

20. The gas generator according to any one of claims 16 to 19, wherein the diameter D is a diameter $D_1$ between outer sides of the closure shell.

21. The gas generator according to claim 16, wherein the cylindrical portion has a height h in a range of 5-30 mm.

22. The gas generator according to claim 16, wherein the gas discharge holes are arranged in a zigzag pattern on a surface of the housing.

23. The gas generator according to claim 16, wherein the first igniter device and the second igniter device include first and second inner cylinders each having a base and a plurality of enhancer holes therearound, an enhancer agent packed in the first inner cylinder and the second inner cylinder, and a first igniter and a second igniter both being placed in contact with the enhancer agent, respectively.

24. The gas generator according to claim 16, wherein
the first igniter device and the second igniter device include first and second inner cylinders each having a base and a plurality of enhancer holes therearound, an enhancer agent packed in the first inner cylinder and the second inner cylinder, and a first igniter and a second igniter both being placed in contact with the enhancer agent, respectively, and
the enhancer holes are arranged in a zigzag pattern on surfaces of the first inner cylinder and the second inner cylinder respectively.

25. The gas generator according to claim 16, wherein
the first igniter device and the second igniter device include first and second inner cylinders each having a base and a plurality of enhancer holes therearound, an enhancer agent packed in the first inner cylinder and the second inner cylinder, and a first igniter and a second igniter both being placed in contact with the enhancer agent, respectively,-and
the enhancer holes are formed on surfaces of cylindrical portions of the first inner cylinder and the second inner cylinder in a form of a slot long along axial directions thereof.

26. The gas generator according to claim 16, wherein
the first igniter device and the second igniter device include first and second inner cylinders each having a base and a plurality of enhancer holes therearound, an enhancer agent packed in the first inner cylinder and the second inner cylinder, and a first igniter and a second igniter both being placed in contact with the enhancer agent, respectively,
the enhancer holes are arranged in a zigzag pattern on surfaces of the first inner cylinder and the second inner cylinder, and
the first inner cylinder or the second inner cylinder is configured to be located in the second combustion chamber which is an upper side chamber of the two partitioned chambers.

27. The gas generator according to claim 16, wherein
the first igniter device and the second igniter device include first and second inner cylinders each having a base and a plurality of enhancer holes therearound, an enhancer agent packed in the first inner cylinder and the second inner cylinder, and a first igniter and a second igniter both being placed in contact with the enhancer agent, respectively,-and
the enhancer holes, which are formed in either the first inner cylinder or the second inner cylinder in the form of a cylinder having an extended axis, are configured to open only in the second combustion chamber which is located on an upper side of the two partitioned chambers.

28. The gas generator according to claim 16, wherein the partition plate is held between the initiator shell and the closure shell.

29. The gas generator according to claim 16, wherein a thickest portion of the filter member is opposed to an entirety of the plurality of gas discharge holes such that a portion of the filter member that is directly below and in contact with the thickest portion of the filter member, but is not opposed to the palarity of gas discharge holes, is less thick than the thickest portion.

30. A gas generator, comprising:
a housing made of metal and including an initiator shell and a closure shell;
a combustion chamber formed in the housing and configured to be packed with a gas generant that generates a high temperature gas by burning;
a filter member arranged around the combustion chamber;
an igniter device located in the housing and configured to ignite and burn the gas generant in the combustion chamber; and
a plurality of gas discharge holes formed in the housing and configured to discharge gas generated in the combustion chamber, wherein
the housing has a generally spherical form, and
the filter member is configured so that a portion thereof around the gas discharge holes bulges inward to make the portion thick to prevent the at least one filter member from being damaged, and the filter member is configured so that, at each position along an axial direction of the gas generator, a thickness of the filter member is substantially the same along a circumference of the filter member.

31. The gas generator according to claim 30, wherein a thickest portion of the filter member is opposed to an entirety of the plurality of gas discharge holes such that a portion of the filter member that is directly below and in contact with the thickest portion of the filter member, but is not opposed to the plurality of gas discharge holes, is less thick than the thickest portion.

32. A gas generator, comprising:
a housing made of metal and including an initiator shell and a closure shell;
a combustion chamber formed in the housing and configured to be packed with a gas generant that generates a high temperature gas by burning;
a filter member arranged around the combustion chamber;
an igniter device located in the housing and configured to ignite and burn the gas generant in the combustion chamber; and a plurality of gas discharge holes formed in the housing and configured to discharge gas generated in the combustion chamber, wherein the housing has a generally oval form, and the at least one filter member is configured so that a portion thereof around the gas discharge holes bulges inward to make the portion thick to prevent the at least one filter member from being damaged, and the filter member is configured so that, at each position along an axial direction of the gas generator, a thickness of the filter member is substantially the same along a circumference of the filter member.

33. The gas generator according to claim 32, wherein a thickest portion of the filter member is opposed to an entirety of the plurality of gas discharge holes such that a portion of the filter member that is directly below and in contact with the thickest portion of the filter member, but is not opposed to the plurality of gas discharge holes, is less thick than the thickest portion.

* * * * *